(Model.)
W. G. PATTON.
Cotton Chopper.
No. 231,083.  Patented Aug. 10, 1880.
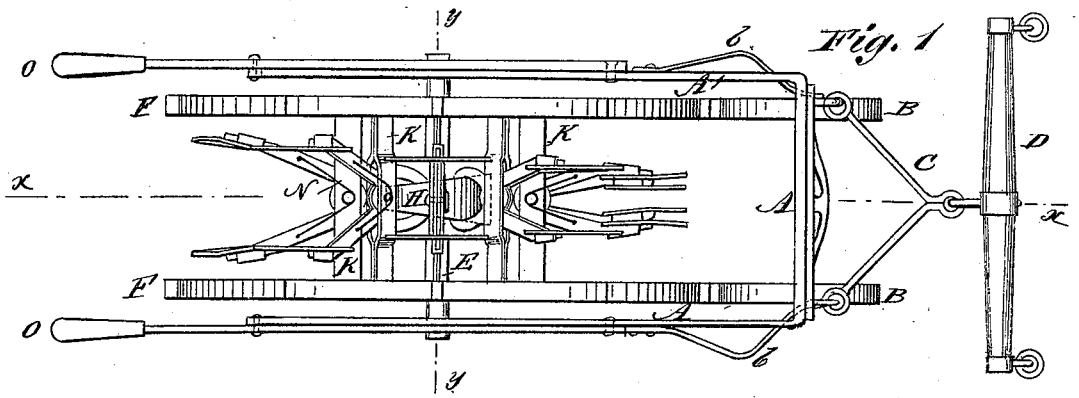
Fig. 1
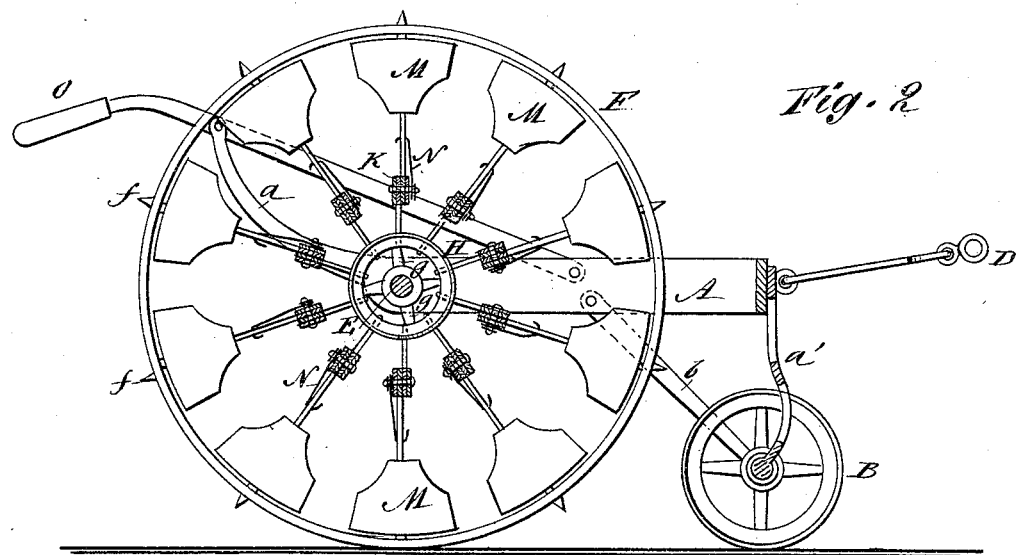
Fig. 2
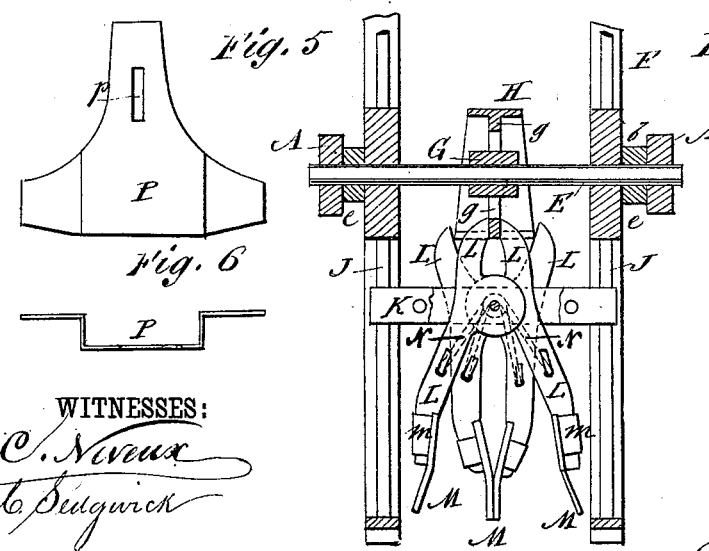
Fig. 5   Fig. 3   Fig. 4
Fig. 6
WITNESSES:
C. Niveux
C. Sedgwick
INVENTOR:
W. G. Patton
BY Munn & Co
ATTORNEYS.

UNITED STATES PATENT OFFICE.

WILLIAM G. PATTON, OF PARK'S STATION, TENNESSEE.

COTTON-CHOPPER.

SPECIFICATION forming part of Letters Patent No. 231,083, dated August 10, 1880.

Application filed May 19, 1880. (Model.)

*To all whom it may concern:*

Be it known that I, WILLIAM G. PATTON, of Park's Station, in the county of Maury and State, invented a new and Improved Cotton-Chopper, of which the following is a specification.

My invention relates to improvements in rotary cotton-choppers; and the objects of my improvements are to produce a machine of which nearly all the parts can be readily constructed, repaired, and replaced by an ordinary blacksmith, and which shall at the same time be durable and thoroughly effective for the purpose intended, as will be now more fully apparent from the description of the machine as illustrated in the accompanying drawings, in which—

Figure 1 is a top-plan view of the machine. Fig. 2 is a vertical longitudinal section taken on the line $x\ x$ of Fig. 1. Fig. 3 is a transverse vertical section taken on the line $y\ y$ of Fig. 1. Fig. 4 is a side elevation of one of the choppers. Fig. 5 is an elevation of one of the hoes to be used when desired to chop and scrape at the same time, and Fig. 6 is a cross-section of the lower part thereof.

The same letters of reference used in the different parts of the drawings refer to the same parts of the machine.

A A A are the side and front bars of the rectangular-shaped main frame of the machine.

To the front bar is attached the depending frame $a'$, which rigidly supports the axle of the forward truck-wheels, B B. The position of the truck is further made rigid in relation to the frame by the braces $b\ b$, extending from opposite ends of the truck-axle to the corresponding side bar of the main frame. To the front bar of the main frame is also attached the yoke C, to which the single or double tree D is secured in the usual manner.

To the rear ends of the side bars of the main frame is rigidly secured the axle E, upon which revolve the main wheels F of the machine. From the rear ends of said side bars also extend rearwardly and upwardly braces $a$ for the handles O O, which are attached to the side bars at points about midway between the axle and the front bar of the frame.

The wheels F F are provided upon their circumferences with spuds, as shown, to prevent slipping. They revolve freely upon the fixed axle E, and their hubs are separated from the axle-bearings by washers $e\ e$.

To the middle of the axle E is rigidly secured the boss or hub G, supporting by arms $g$ the cam H, the shape of which is clearly indicated in Figs. 1 and 3. The widest part of the cam is at a point nearly at the lowest part thereof, where it ends abruptly, being immediately succeeded by the narrowest part of the cam, which from that point gradually increases in width to the widest part, for the purpose hereinafter clearly explained.

The spokes J J of the wheels F are set at regular intervals, and upon each pair is adjustably secured the cross-bar K. As shown in the drawings, the cross-bars K are double, having eyes or loops formed upon their ends, by which means they may be moved up or down upon the spokes. Between the two parts of these cross-bars, and at the middle thereof, are pivoted the crossed levers L L, the upper ends of which bear upon the outside of the cam H, and to the lower ends of which are attached the choppers or hoes M M by means of the loops $m\ m$.

It is manifest that the depth at which the choppers or hoes shall act may be regulated either by adjusting the cross-bars K up or down upon the spokes J J, or by moving the choppers M upon the levers L, set or through screws being used in either case, as desired.

Attached to the middle of the cross-bars K are the springs N N, one end of each of which is attached to one of the two levers L, pivoted to the same cross-bar at some distance below the pivot. The tension of the spring is constantly exerted to throw apart the two choppers attached to the levers with which it is connected.

The operation of the machine is as follows: As the machine is drawn forward the upper ends of the levers carrying the choppers or hoes are gradually forced apart by reason of the increasing width of the cam drawing the choppers together until they are in contact at the lowest part of their revolution. At this point the upper ends of the levers are released from the action of the widest part of the cam, and by the force of the springs the choppers are thrown violently outward, chopping out a block of the young plants equal in area to the width of the choppers and the length of their stroke.

If it is desired to thin out at greater intervals, as in going over the field the second time, alternate sets of choppers may be removed.

If it is desirable to scrape and chop at the same time, the hoes P (shown in Figs. 5 and 6) may be employed. These may be attached either by means of slots $p$ or by loops and screws, as in the case of the other form shown in Fig. 4.

Having thus described my invention, I claim as new and desire to secure by Letters Patent—

1. In combination with the spokes J J of the main wheels, the cross-bars K, to which are pivoted the chopper-carrying levers L, as and for the purpose described.

2. In combination with the non-rotating axle E, having secured thereto the cam H, the crossed chopper-carrying levers L and their springs N, as and for the purpose described.

WILLIAM G. PATTON.

Witnesses:
J. S. McAFEE,
JOHN T. AGNEW.